C. S. GARRIGUS.
Combination-Tool.

No. 225,587.  Patented Mar. 16, 1880.

Attest:
F. H. Schott.
Philip Maur

Inventor:
Culberson S. Garrigus

UNITED STATES PATENT OFFICE.

CULBERSON S. GARRIGUS, OF WINCHESTER, ASSIGNOR OF ONE-HALF OF HIS RIGHT TO JOHN PURCELL, OF FREDERICK COUNTY, VIRGINIA.

COMBINATION-TOOL.

SPECIFICATION forming part of Letters Patent No. 225,587, dated March 16, 1880.

Application filed December 17, 1879.

*To all whom it may concern:*

Be it known that I, CULBERSON S. GARRIGUS, of Winchester, in the county of Frederick and State of Virginia, have invented certain new and useful Improvements in Combination-Tools; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improvement in agricultural implements, the object being to so construct a single implement that by a simple adjustment it may be used as a hoe, spade, tree-scraper, hedging or sod knife, and pruning-knife; and the invention consists in the construction of the different parts of the implement so that they can be arranged to perform the functions above named, all as will be hereinafter fully described, and then specifically pointed out in the claim.

Figure 1:
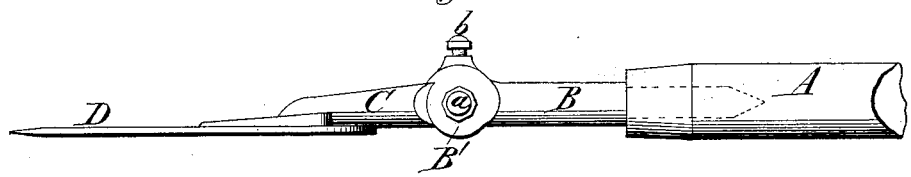
Figure 2:
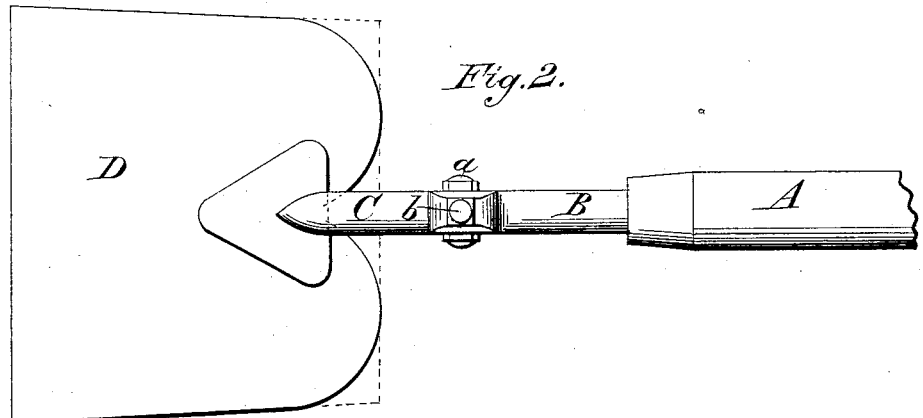
Figure 3:
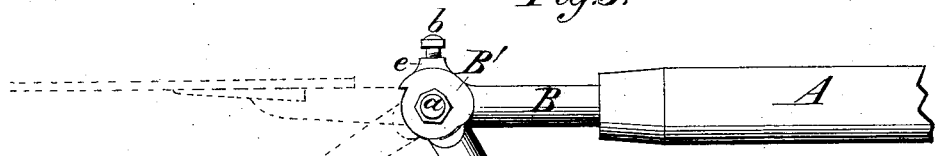
Figure 4:
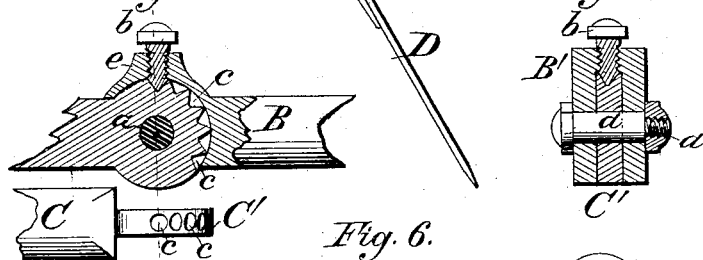
Figure 5:
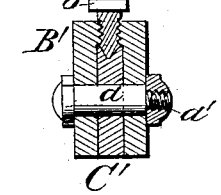
Figure 6:
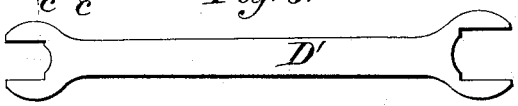

In the drawings, Figure 1 is a side or edge view of the implement, with the blade in line with the handle, so that it may be used as a cutting-instrument or spade. Fig. 2 is a plan view with the blade arranged as in Fig. 1. Fig. 3 shows the blade secured at an angle to the handle, as when the implement is used as a hoe, the dotted lines showing the blade arranged to act as a scraper. Fig. 4 is a longitudinal section through the joint which connects the blade to the shank. Fig. 5 is a transverse section through the joint; and Fig. 6 shows a wrench, by means of which the several adjustments may be made.

Various devices have heretofore been employed for securing the blades of hoes at different angles to their handles, so that they might be operated in such a manner as to act as weeders, or to give such an inclination to the blade as the person using the implement might deem best to enable it to perform its function as a hoe in a proper manner; but most of these have proved to be of little or no practical benefit, owing to either the fragility or clumsiness of their construction.

These objections I have obviated by constructing my improved implement in the manner hereinafter described.

A represents the handle, which may be of any desired length, and B shows the metal shank, one end of which is firmly secured in the handle in any suitable manner, its opposite enlarged end, B', being formed into a circular socket, which receives a similarly-shaped tongue or tenon, C', formed upon the outer end of the tang C, the two, as united, producing what is commonly called a "rule-joint," and moving freely upon the screw-bolt $a$, which forms a pivotal connection between them, the opposite end of this tang C being spread out and riveted or otherwise secured to the blade D.

The upper side of the socket B' is enlarged at $e$ and pierced with a screw-threaded orifice, which receives the set-screw $b$, the point of which may be made to enter any one of a series of a conical depressions, $c$, formed in the periphery of the tongue C', as is clearly shown in Figs. 4 and 5 of the drawings.

It will thus be apparent that by means of the wrench D', (shown in Fig. 6,) one end of which fits the nut $a'$ on the bolt $a$ and the other the head of the set-screw $b$, the nut may be loosened and the point of the set-screw withdrawn from the conical depressions $c$, and the blade D turned so as to be parallel with the handle, or placed at any desired angle thereto, when, if the set-screw and nut are again tightened, the blade will be held firmly, in whatever position it may have been placed.

It will also be observed that the blade, together with its tang, may be reversed, so as to bring the wear alternately upon opposite sides of the edge, thus causing the blade to become self-sharpening, and adding much to the value of the implement, which, it is believed, will meet the wants of the agricultural portion of the community in a perfectly satisfactory manner.

Having thus described my invention, I claim as new, and desire to secure by Letters Patent, the following:

In a combination-tool for agricultural purposes, the blade D and tang C, with its tongue C', in combination with the handle A and shank B, the latter being provided with the socket B', having bolt $a$ and screw $b$, all constructed and arranged as shown, for adjusting the tang and blade in any desired position, as specified.

In testimony that I claim the foregoing I have hereunto set my hand this 10th day of December, 1879.

CULBERSON S. GARRIGUS.

Witnesses:
JOHN C. TASKER,
CHARLES P. WEBSTER.